US008363046B2

(12) United States Patent
Miyazaki

(10) Patent No.: US 8,363,046 B2
(45) Date of Patent: Jan. 29, 2013

(54) REFERENCE VOLTAGE GENERATOR INCLUDING CIRCUITS FOR SWITCH, CURRENT SOURCE AND CONTROL

(75) Inventor: Kiyoshi Miyazaki, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 360 days.

(21) Appl. No.: 12/654,246

(22) Filed: Dec. 15, 2009

(65) Prior Publication Data

US 2010/0171732 A1 Jul. 8, 2010

(30) Foreign Application Priority Data

Jan. 8, 2009 (JP) ................................ 2009-002356

(51) Int. Cl.
*G06F 3/038* (2006.01)
*G09G 5/00* (2006.01)

(52) U.S. Cl. ......................................... 345/211; 345/87

(58) Field of Classification Search .................. 345/211, 345/212, 213, 87, 95, 210
See application file for complete search history.

(56) References Cited

U.S. PATENT DOCUMENTS

| | | | | |
|---|---|---|---|---|
| 6,236,194 | B1 * | 5/2001 | Manabe et al. | 323/274 |
| 7,092,304 | B2 | 8/2006 | Ogiwara et al. | |
| 7,825,919 | B2 * | 11/2010 | Woo et al. | 345/211 |
| 2005/0143045 | A1 * | 6/2005 | Jiguet et al. | 455/343.1 |

FOREIGN PATENT DOCUMENTS

JP 2005-339724 12/2005

* cited by examiner

*Primary Examiner* — Chanh Nguyen
*Assistant Examiner* — Kwang-Su Yang
(74) *Attorney, Agent, or Firm* — McGinn IP Law Group, PLLC

(57) ABSTRACT

A reference voltage generator includes an output terminal, a load circuit connected between the output terminal and a ground voltage terminal, an output transistor connected between the output terminal and a power supply voltage terminal, a first constant current source connected between the output terminal and the power supply voltage terminal, a first switch circuit that selectively connects the output terminal with the output transistor or the first constant current source, and a control circuit that controls a band-gap current to be supplied to the load circuit. In a first state, the first switch circuit connects the output terminal with the output transistor, and the control circuit controls an activation state of the output transistor. In a second state, the first switch circuit connects the output terminal with the first constant current source, and the control circuit controls the amount of current drawn from the first constant current source.

9 Claims, 8 Drawing Sheets

300

300

REFERENCE VOLTAGE GENERATOR INCLUDING CIRCUITS FOR SWITCH, CURRENT SOURCE AND CONTROL

BACKGROUND

1. Field of the Invention

The present invention relates to a reference voltage generator.

2. Description of Related Art

A liquid crystal driver for a mobile device such as a cellular phone is increasingly integrated into an IC that drivers an LCD panel, which is called one-chip integration, with the current trend towards downsizing and cost reduction. Further, a power supply circuit necessary for driving liquid crystals in an LCD is also increasingly built into a driver IC. In such a built-in power supply, a reference power supply has a function of determining a liquid crystal driving voltage. Therefore, if an output voltage of the reference power supply is unstable, LCD display quality is adversely affected. Accordingly, the stability of an output voltage of the reference power supply has been regarded as being particularly important recently.

As the reference power supply in a driver, a band-gap reference circuit (which is referred to hereinafter as a BGR circuit) that outputs a constant voltage in which temperature characteristics are cancelled is generally used. The BGR circuit is generally configured in such a way that a resistor is connected to each of two diodes in pairs with a different size ratio or the like. The BGR circuit then stabilizes the balance of two specific node potentials respectively connected to the diodes in pairs and further selects a certain resistance value, thereby canceling the temperature characteristics of the diodes and enabling output of a constant stable voltage. The BGR circuit is widely used as a basic voltage of a general IC.

Further, there is a strong demand for power saving during standby in a mobile device today. For example, low power consumption in standby mode when display is in the off state but operation in an IC is in the on state is a necessary feature of a device.

FIGS. 8A and 8B are exemplary schematic block diagrams of a display driver 1. The display driver 1 includes a BGR circuit 2, amplifiers 3 and 4, a driver amplifier 5, an LCD panel 6, and a logic circuit unit 7. FIGS. 8A and 8B schematically show the configurations in normal operation mode and in standby mode, respectively.

The BGR circuit 2 serves as a power supply generation reference for driving of the LCD panel 6 in normal operation mode. The highest level or the lowest level of a driving voltage of the LCD panel 6 (the higher level or the lower level of a gamma voltage) is determined based on the reference voltage. Therefore, the stability of the voltage is extremely important in order to prevent degradation of panel display quality. The amplifiers 3 and 4 amplify a voltage supplied from the BGR circuit 2 at a predetermined multiple number. The driver amplifier 5 drives the load of the LCD panel 6 by using a voltage from the amplifier 3 as a power supply voltage. The logic circuit unit 7 includes logic circuits 7*a* and 7*b*. The logic circuits 7*a* and 7*b* perform specified logic operation by using a voltage from the amplifier 4 as a power supply voltage.

On the other hand, in standby mode, display of the LCD panel is turned off, and the amplifier 3, the driver amplifier 5 and the LCD panel 6 enter the off state. The logic circuit 7*b* also enters the off state. However, the logic circuit 7*a* is still in operation because state setting after standby release, writing of display information from an external microcomputer or the like is performed, for example. Accordingly, the BGR circuit 2 and the amplifier 4 remain in the on state in order to supply a power to the logic circuit 7*a*. Because the BGR circuit 2 consumes a current during the on state, standby time is significantly degraded unless lowering an operating current as much as possible. It is thus an important feature of the BGR circuit 2 that current consumption is as low as possible.

As described above, it is becoming a necessary feature of the BGR circuit as a reference power supply for a liquid crystal driver to satisfy two demands: stability during normal operation and low power consumption during standby. Further, it is required to achieve the demands without increasing the circuit scale as a driver for use in a mobile device.

An example of a BGR circuit according to prior art is disclosed in Japanese Unexamined Patent Publication No. 2005-339724. FIG. 9 shows a BGR circuit 10 described in Japanese Unexamined Patent Publication No. 2005-339724. The BGR circuit 10 includes resistors R1 to R3, diodes D1 and D2, an operational amplifier OP1, and a PMOS transistor TP1. The resistor R1 and the diode D1 are connected in series between a reference voltage output terminal Vref and a ground voltage terminal GND. The resistors R2 and R3 and the diode D2 are connected in series between the reference voltage output terminal Vref and the ground voltage terminal GND. The operational amplifier OP1 has an inverting input terminal connected to an intermediate node A1 between the resistor R1 and the diode D1, and a non-inverting input terminal connected to an intermediate node A2 between the resistors R2 and R3. The PMOS transistor TP1 has a source connected to a power supply voltage terminal VDD, a drain connected to the reference voltage output terminal Vref, and a gate connected to an output terminal of the operational amplifier OP1. Note that, the symbols “VDD”, “GND” and “Vref” of the terminals designate the respective terminal names and also designate a power supply voltage VDD, a ground voltage GND and a reference voltage Vref, respectively, for the sake of convenience.

SUMMARY

In the BGR circuit 10 described above, a drive current of the PMOS transistor TP1 is determined according to loads by circuit operation and thus easily optimized, so that current consumption can be minimized. It is thus suitable for a reference voltage generator of a mobile device or the like. However, the BGR circuit 10 drives diodes and resistor loads by an output current of the PMOS transistor TP1, which is a source-drain current. If the power supply voltage VDD fluctuates, a source potential of the PMOS transistor TP1 fluctuates accordingly. For example, if the power supply voltage VDD fluctuates towards the higher potential side, a gate potential of the PMOS transistor TP1 cannot follow the fluctuation, resulting in an increase in a source-gate potential VGS. Consequently, the PMOS transistor TP1 is overdriven, causing Vref to rise. In this way, in the configuration of the BGR circuit 10, the reference voltage Vref is subject to fluctuation of the power supply voltage VDD, thus having a drawback that a power supply noise rejection ratio is not high enough. This raises a concern that, if fluctuation of the reference voltage Vref occurs during normal operation of a display driver of liquid crystals or the like, panel display quality is degraded. There is thus a demand for a reference voltage generator in which display quality is not degraded in normal operation mode and current consumption is as low as possible in standby mode when display is not performed.

An exemplary aspect of an embodiment of the present invention is a reference voltage generator that includes an output terminal, a load circuit connected between the output terminal and a ground voltage terminal, an output transistor connected between the output terminal and a power supply voltage terminal, a first constant current source connected between the output terminal and the power supply voltage terminal, a first switch circuit that selectively connects the output terminal with one of the output transistor and the first constant current source, and a control circuit that controls a band-gap current to be supplied to the load circuit, wherein in a first state, the first switch circuit connects the output terminal with the output transistor and the control circuit controls an activation state of the output transistor, and in a second state, the first switch circuit connects the output terminal with the first constant current source and the control circuit controls the amount of current drawn from the first constant current source.

In the reference voltage generator according to the exemplary aspect of an embodiment of the present invention, the band-gap current is supplied to the load circuit from the first constant current source in the first state, and the band-gap current is supplied to the load circuit through the output transistor in the second state. Therefore, the reference voltage generator according to the exemplary aspect of an embodiment of the present invention has a circuit configuration suitable for low current consumption in the first state and it has a circuit configuration highly resistant to power supply noise in the second state.

According to the exemplary aspect of an embodiment of the present invention described above, it is possible to provide a reference voltage generator with low current consumption and high resistance to power supply noise.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

[First Exemplary Embodiment]

Figure 1:
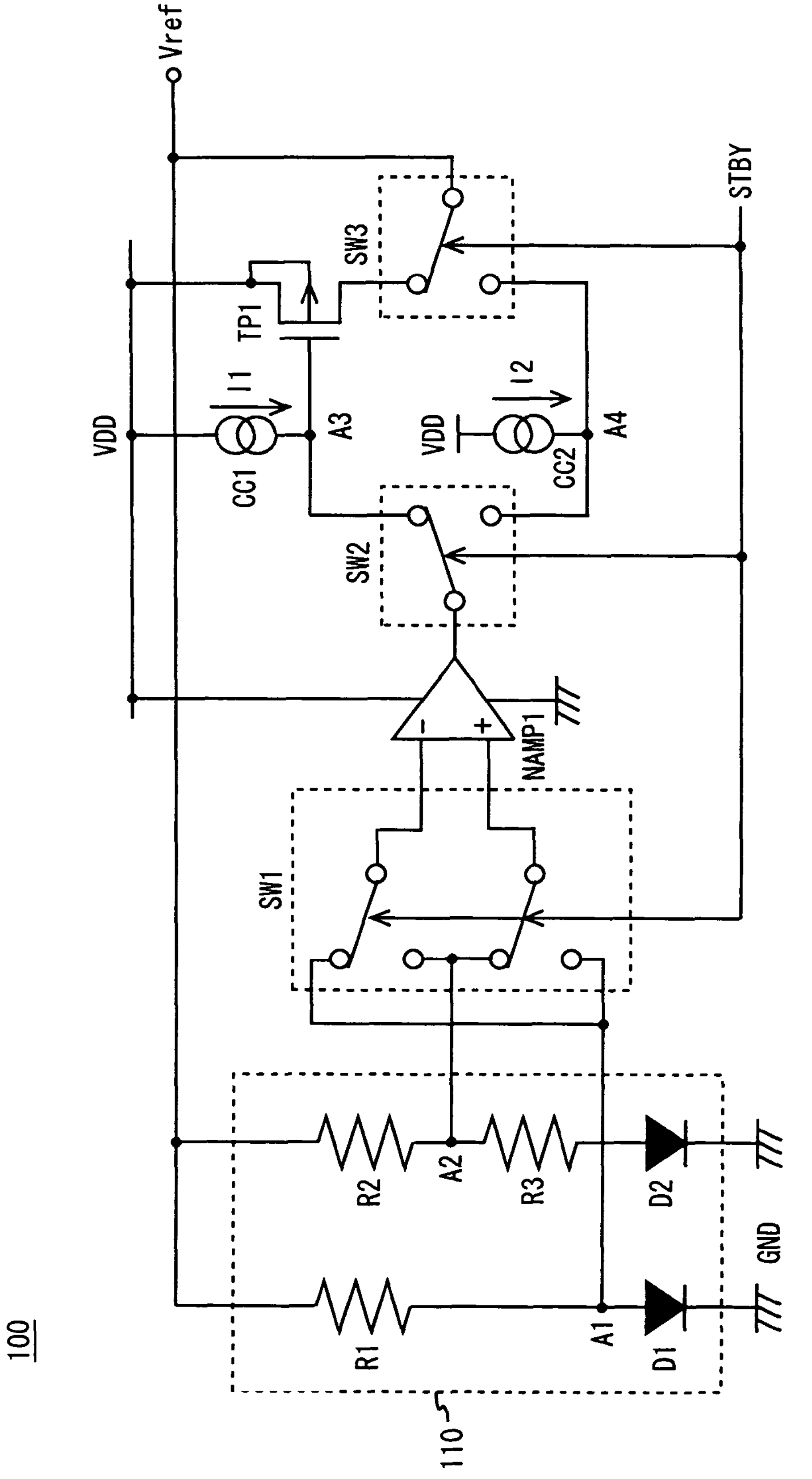
FIG. 1 shows a configuration of a BGR circuit according to a first exemplary embodiment.
Figure 8A:
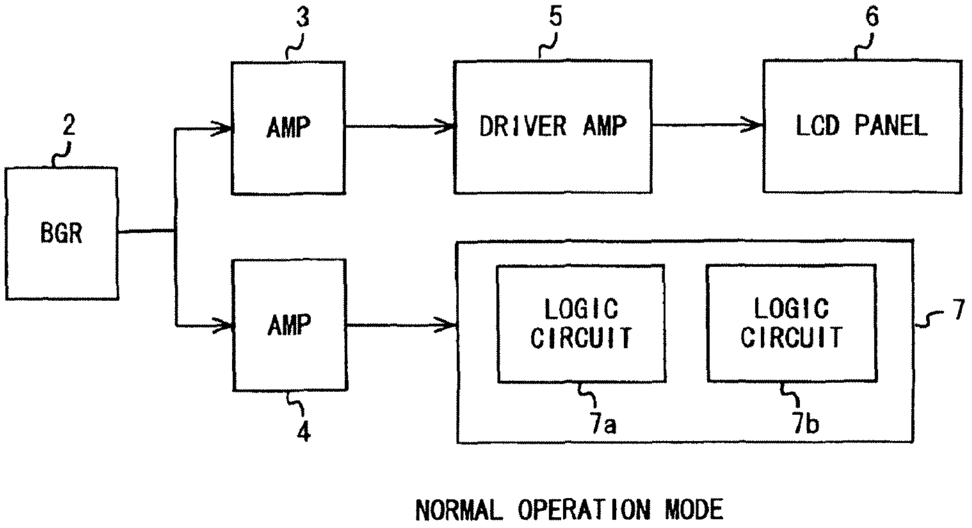
Fig. 8A (RELATED ART)
FIG. 8A is a block diagram showing a display driver according to related art.
Figure 8B:
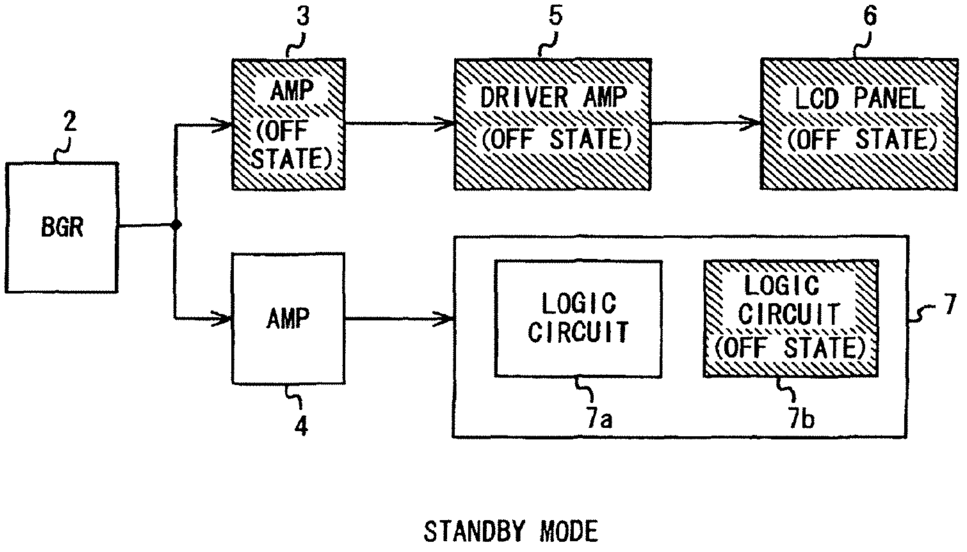
Fig. 8B (RELATED ART)
FIG. 8B is a block diagram showing a display driver according to related art.

A first exemplary embodiment of the present invention is described hereinafter in detail with reference to the drawings. In the first exemplary embodiment, the present invention is applied to a band-gap reference circuit (which is referred to hereinafter as a BGR circuit) of a liquid crystal display driver for a mobile device, for example. FIG. 1 shows an example of a configuration of a BGR circuit 100 according to the first exemplary embodiment. A display driver has two operating states: normal operation and standby, as described earlier with reference to FIGS. 8A and 8B. The BGR circuit 100 also has normal operation and standby states, and a control signal STBY, which is described later, changes when the state changes.

Referring to FIG. 1, the BGR circuit 100 includes switches SW1 to SW3, constant current sources CC1 and CC2, an amplifier NAMP1, a PMOS transistor TP1, resistors R1 to R3, and diodes D1 and D2. Further, the BGR circuit 100 has a power supply voltage terminal VDD, a ground voltage terminal GND and a reference voltage output terminal Vref. Note that, the symbols "VDD", "GND" and "Vref" designate the respective terminal names and also designate a power supply voltage, a ground voltage and a reference voltage, respectively, for the sake of convenience. Further, the symbols "R1" to "R3" designate the respective resistor names and also designate their resistance values.

The resistor R1 has one end connected to the reference voltage output terminal Vref and the other end connected to a node A1. The diode D1 has an anode connected to the node A1 and a cathode connected to the ground voltage terminal GND.

The resistor R2 has one end connected to the reference voltage output terminal Vref and the other end connected to a node A2. The resistor R3 has one end connected to the node A2 and the other end connected to an anode of the diode D2. The diode D2 has an anode connected to the other end of the resistor R3 and a cathode connected to the ground voltage terminal GND. The resistors R1 to R3 and the diodes D1 and D2 constitute a load circuit 110.

Forward drop voltages of the diodes D1 and D2 have a negative temperature coefficient and vary in inverse proportion to the absolute temperature. Resistance values of the resistors R1 to R3 have a positive temperature coefficient and vary in proportion to the absolute temperature. Thus, the reference voltage Vref with no temperature dependence can be obtained from the reference voltage output terminal Vref by adjusting the area ratio of the diodes D1 and D2 and the resistance values of the resistors R1 to R3 to specified values and connecting the nodes A1 and A2 to the amplifier NAMP1, which is described later.

The switch SW1 switches connection between the nodes A1 and A2 with the inverting input terminal and the non-inverting input terminal of the amplifier NAMP1 in accordance with a control signal STBY. Specifically, in standby mode, the switch SW1 connects the nodes A1 and A2 with the inverting input terminal and the non-inverting input terminal of the amplifier NAMP1, respectively. In normal operation mode, the switch SW1 connects the nodes A1 and A2 with the non-inverting input terminal and the inverting input terminal of the amplifier NAMP1, respectively.

Figure 2:
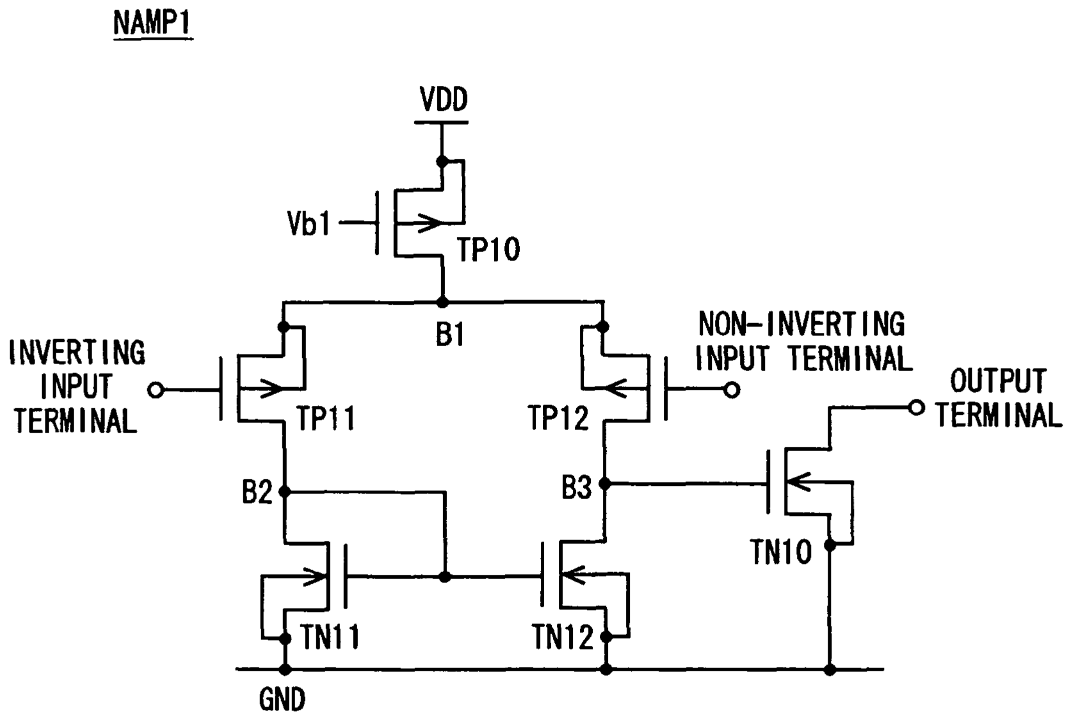
FIG. 2 shows a configuration of an amplifier NAMP according to the first exemplary embodiment.

The output terminal of the amplifier NAMP1 is connected to the switch SW2. FIG. 2 shows an example of a circuit configuration of the amplifier NAMP1. Referring to FIG. 2, the amplifier NAMP1 includes PMOS transistors TP10 to TP12 and NMOS transistors TN10 to TN12. The PMOS transistor TP10 has a source connected to the power supply voltage terminal VDD and a drain connected to a node B1. Further, a prescribed bias voltage Vb1 is applied to a gate of the PMOS transistor TP10. The PMOS transistor TP11 has a source connected to the node B1 and a drain connected to a node B2. A gate of the PMOS transistor TP11 serves as the inverting input terminal of the amplifier NAMP1. The NMOS transistor TN11 has a drain and a gate connected to the node B2 and a source connected to the ground voltage terminal GND. The PMOS transistor TP12 has a source connected to the node B1 and a drain connected to a node B3. A gate of the PMOS transistor TP12 serves as the non-inverting input terminal of the amplifier NAMP1. The NMOS transistor TN12 has a drain connected to the node B3, a source connected to the ground voltage terminal GND, and a gate connected to the node B2. A drain of the NMOS transistor TN10 serves as an output terminal of the amplifier NAMP1. The NMOS transistor TN10 has a source connected to the ground voltage terminal GND and a gate connected to the node B3.

As is understood from the configuration shown in FIG. 2, the amplifier NAMP1 is composed of a differential amplifier which outputs a voltage in accordance with a potential difference between the inverting input terminal and the non-inverting input terminal and the NMOS transistor TN10 which is driven in accordance with the output voltage. Thus, the amplifier NAMP1 performs operation that drives the NMOS transistor TN10 by the output voltage from the differential amplifier and brings the potential of the output terminal of the amplifier NAMP1 down to the ground voltage GND.

The switch SW2 switches connection between the output terminal of the amplifier NAMP1 with a node A3 or a node A4 in accordance with the control signal STBY. Specifically, in standby node, the switch SW2 connects the output terminal of the amplifier NAMP1 with the node A3. In normal operation mode, the switch SW2 connects the output terminal of the amplifier NAMP1 with the node A4.

The constant current source CC1 is connected between the power supply voltage terminal VDD and the node A3, and supplies a constant current I1 having a prescribed current value. The constant current source CC2 (first constant current source) is connected between the power supply voltage terminal VDD and the node A4, and supplies a constant current I2 having a prescribed current value. The symbols "I1" and "I2" designate constant currents supplied from the respective constant current sources and also designate their current values.

Figure 3:
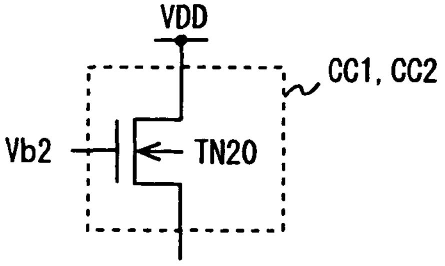
FIG. 3 shows a configuration of a constant current source according to the first exemplary embodiment.

FIG. 3 shows an example of a circuit configuration of the constant current source CC1 or CC2. Because the constant current sources CC1 and CC2 have the same configuration, only the constant current source CC1 is described below. Referring to FIG. 3, the constant current source CC1 includes an NMOS transistor TN20. A drain of the NMOS transistor TN20 is connected to the power supply voltage terminal VDD, and a source of the NMOS transistor TN20 serves as a current output terminal of the constant current source CC1. A prescribed bias voltage Vb2 is applied to a gate of the NMOS transistor TN20, and the constant current I1 corresponding to the potential of the bias voltage Vb2 is supplied from the current output terminal of the constant current source CC1. The potential of the bias voltage Vb2 is different between the constant current sources CC1 and CC2, and the constant current source CC2 has a higher current supply capability than the constant current source CC1. Accordingly, the constant current I2 has a larger current value than the constant current I1. The circuit configuration of the constant current source CC1 or CC2 shown in FIG. 3 is just by way of example, and another circuit configuration may be employed as long as it can supply a constant current with a prescribed current value.

The PMOS transistor TP1 (output transistor) has a source connected to the power supply voltage terminal VDD, a drain connected to the switch SW3 and a gate connected to the node A3.

The switch SW3 (first switch circuit) switches connection between the reference voltage output terminal Vref with the drain of the PMOS transistor TP1 or the node A4 in accordance with the control signal STBY. Specifically, in standby mode, the switch SW3 connects the reference voltage output terminal Vref with the drain of the PMOS transistor TP1. In normal operation mode, the switch SW3 connects the reference voltage output terminal Vref with the node A4.

The amplifier NAMP1 and the switch SW2 operate as a control circuit for the PMOS transistor TP1 or the NMOS transistor TN10, as described later.

The operation of the BGR circuit 100 is described hereinbelow. The operation in standby mode is described firstly. In standby mode, the switch SW1 connects the nodes A1 and A2 with the inverting input terminal and the non-inverting input terminal of the amplifier NAMP1, respectively, in accordance with the control signal STBY. At the same time, the switch SW2 connects the output terminal of the amplifier NAMP1 with the node A3. Further, the switch SW3 connects the reference voltage output terminal Vref with the drain of the PMOS transistor TP1.

In such connection state (which is hereinafter called a Pch driving type), the PMOS transistor TP1 is driven by the constant current source CC1 and the output of the amplifier NAMP1. The constant current source CC1, however, may act as a pull-up resistor which is necessary for turning off the PMOS transistor TP1. Thus, the current value of the constant current I1 that is supplied from the constant current source CC1 can be the lowest possible value. For example, the current value of the constant current I1 can be as low as 0.1 μA.

General operation when the Pch driving type BGR circuit 100 supplies a constant reference voltage is briefly described hereinafter. First, a output current (source-drain current) of the PMOS transistor TP1 of the BGR circuit 100 is supplied to the connected loads (the diodes D1 and D2 and the resistors R1 to R3). If the potentials of the nodes A1 and A2 change, the output voltage of the amplifier NAMP1 changes accordingly. In accordance with a change in the output voltage of the amplifier NAMP1, a drive current of the PMOS transistor TP1, which is a current supplied to the diodes D1 and D2, the resistors R1 to R3 and so on, changes. As a result of such feed back operation, the Pch driving type BGR circuit 100 can keep the reference voltage Vref constant without depending on the loads (the diodes D1 and D2 and the resistors R1 to R3) connected to the PMOS transistor TP1. In this manner, in the Pch driving type BGR circuit 100, a drive current of the PMOS transistor TP1 is determined according to loads by circuit operation and thus easily optimized, so that current consumption can be minimized.

A circuit current of the Pch driving type BGR circuit 100 is briefly calculated hereinbelow. As described above, currents to flow into the diodes D1 and D2 are determined by the resistors R1 and R2 and forward voltage drop VF of the respective diodes. They are set to be 1 μA, for example. Further, the constant current I1 is assumed to be 0.1 μA, and the bias current of the amplifier NAMP1 is assumed to be 0.5 μA. Thus, the total circuit current is 1 μA×2+0.5 μA+0.1 μA=2.6 μA.

Figure 9:
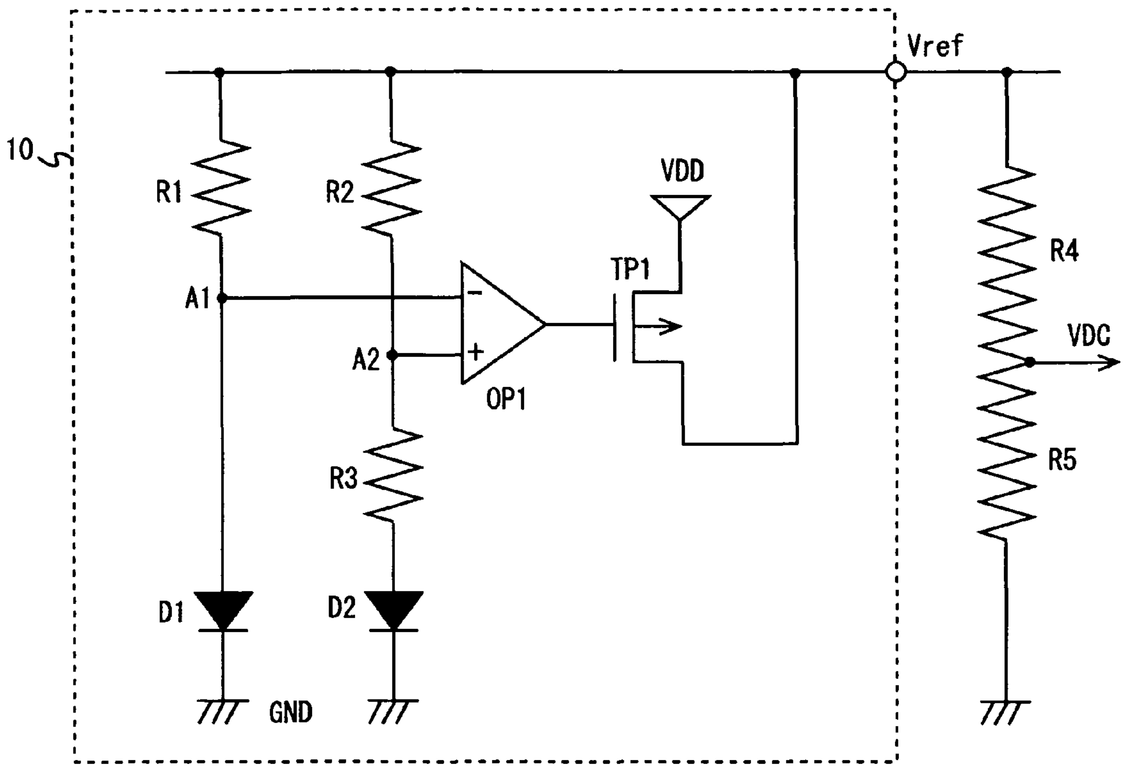
PRIOR ART Fig. 9
FIG. 9 shows a configuration of a BGR circuit according to prior art.

However, the Pch driving type BGR circuit 100 has the same concern as the BGR circuit 10 according to prior art which is described earlier with reference to FIG. 9. Specifically, there is a possibility that the occurrence of fluctuation in the power supply voltage VDD can cause the PMOS transistor TP1 to be overdriven. Therefore, the reference voltage Vref, which is the output of the BGR circuit 100, is subject to fluctuation of the power supply, which degrades the power supply noise rejection ratio.

Summarizing the above, the Pch driving type BGR circuit 100 has a circuit configuration having a drawback that the power supply noise rejection ratio is not high enough and an advantage that current consumption is significantly low.

Next, the operation in normal operation mode when standby is released is described. In normal operation mode, the switch SW1 connects the nodes A1 and A2 with the non-inverting input terminal and the inverting input terminal of the amplifier NAMP1, respectively, in accordance with the control signal STBY. At the same time, the switch SW2 connects the output terminal of the amplifier NAMP1 with the node A4. Further, the switch SW3 connects the reference voltage output terminal Vref with the node A4.

In this manner, connections of the respective switches are opposite to those in standby mode, so that the output of the amplifier NAMP1 is directly connected to the reference voltage output terminal Vref without through the PMOS transistor TP1. The BGR circuit 100 in this connection state operates in the same way as in standby mode. However, a current to be supplied to loads such as the resistors R1 to R3 and the diodes D1 and D2 is supplied from the constant current source CC2. Thus, the current is kept in balance by driving the NMOS transistor TN10 of the amplifier NAMP1 so as to keep the reference voltage Vref constant and drawing the constant current I2 output from the constant current source CC2 to the ground voltage terminal GND. In the BGR circuit 100 in this connection state (which is hereinafter called an Nch driving type), a drive current is supplied not from the PMOS transistor TP1 connected to the power supply voltage VDD as in the Pch driving type but from the constant current source CC2, thus having an advantage of outputting a stable voltage against fluctuation of the power supply voltage VDD. However, the Nch driving type BGR circuit 100 has the following drawback.

The constant current I2 from the constant current source CC2 is the only current source that drives loads such as the diodes D1 and D2 and the resistors R1 to R3 in the Nch driving type BGR circuit 100. Therefore, the reference voltage Vref drops if the current from the constant current source CC2 is not sufficiently supplied to the loads. Thus, in order to maintain the constant reference voltage Vref, it is necessary to allow the constant current I2 from the constant current source CC2 to flow in consideration of variation of loads (the resistors R1 to R3, the diodes D1 and D2 etc.) and variation of a bias current to flow into the NMOS transistor TN10 of the amplifier NAMP1 (temperature dependence, threshold voltage variation, manufacturing variation etc.), which are offsets. Specifically, setting is fundamental which maximizes the current value of the constant current I2 on the assumption of all variations of the diodes D1 and D2 and the resistors R1 to R3 under the worst conditions such as operating temperature, forward voltage drop VF and resistance. Accordingly, the constant current I2 from the constant current source CC2 has a high value even when a current to flow into the diodes D1 and D2 and the resistors R1 to R3 is low under typical conditions, resulting in high current consumption in the circuit. Generally, two to three times the current to flow into the diodes D1 and D2 under typical conditions is required in consideration of the worst conditions. Note that, no problem occurs when a current supplied from the constant current source CC2 is high because a sink current of the NMOS transistor TN10 of the amplifier NAMP1 becomes higher and stabilized to be in balance.

A circuit current of the Nch driving type BGR circuit 100 is briefly calculated hereinbelow. Currents to flow into the diodes D1 and D2 are set to be 1 μA, for example, just like the case described above. In this case, however, a bias current of the amplifier NAMP1 is assumed to be 0 μA for simplification. An increment in circuit current in consideration of the worst conditions is 1 μA×2(the number of diodes)×3=6 μA. Accordingly, the total circuit current is 1 μA×2+0.5 μA+6 μA=8.5 μA.

Summarizing the above, the Nch driving type BGR circuit 100 is a circuit having an advantage that an operating current is constantly stabilized under any conditions and the reference voltage Vref does not fluctuate and a drawback that current consumption is high even under light-load conditions.

As described earlier with reference to FIGS. 8A and 8B, a power supply of a display driver is off and panel display is also in the off state in standby mode. Thus, in standby mode, there is no problem in display quality in spite of some effects of power supply noise. On the other hand, in normal operation mode, the BGR circuit to serve as a reference power supply is necessary to supply a stable reference voltage. Further, power consumption of a display driver during normal operation is not necessarily as low as power consumption during standby. This is because normal operation mode is a state when image data from a microcomputer is written at high speed, and a current of several tens of mA or higher, including a consumption current by charge and discharge of an LCD panel (capacity load), is consumed in the display driver.

In standby mode, the BGR circuit 100 operates with a current of 3 μA or lower as the Pch driving type BGR circuit, and, in normal operation mode, it switches to the Nch driving type BGR circuit and current consumption increases to 10 to 20 μA. However, current consumption of the Nch driving type BGR circuit 100 in normal operation mode is 0.1% or lower in the display driver as a whole where a current of several tens of mA or higher is consumed.

Therefore, the display driver is not substantially affected by an increase in current consumption when the BGR circuit 100 switches from the Pch driving type to the Nch driving type. By switching from the Pch driving type to the Nch driving type in normal operation mode, it is possible to supply a stable reference voltage.

On the other hand, if the BGR circuit 100 switches from the Pch driving type to the Nch driving type in standby mode, a consumption current increases from 3 μA or lower to 8 μA or higher. The consumption current thus changes about 2.7 times. If such state continues for a long time, it has a significant impact on the standby time of a mobile device. Therefore, the Pch driving type BGR circuit 100 with low current consumption is desired in standby mode.

As described above, the BGR circuit 100 according to the first exemplary embodiment operates as the Pch driving type BGR circuit with low noise resistance and low current consumption in standby mode and as the Nch driving type BGR circuit with double current consumption and high noise resistance in normal operation mode. A hitherto known BGR circuit has a circuit configuration of either the Pch driving type or the Nch driving type in consideration of trade-off between current consumption and noise of a system power supply. However, it has been difficult to maximally achieve stabilization with a minimum current, which is demanded for a display driver for use in a mobile device. On the other hand, the BGR circuit 100 switches its configuration between the Pch driving type in standby mode and the Nch driving type in normal operation mode, thus implementing an optimum circuit configuration having an advantage corresponding to each operating state. Further, the BGR circuit 100 can use the diodes D1 and D2, the resistors R1 to R3, the amplifier NAMP1 and so on in common by means of the switches SW1 to SW3. This eliminates the need to have separate BGR circuit configurations for the Pch driving type and the Nch driving type. It is thereby possible to reduce the circuit scale while having the advantages of the two circuit configurations described above.

[Second Exemplary Embodiment]

Figure 4:
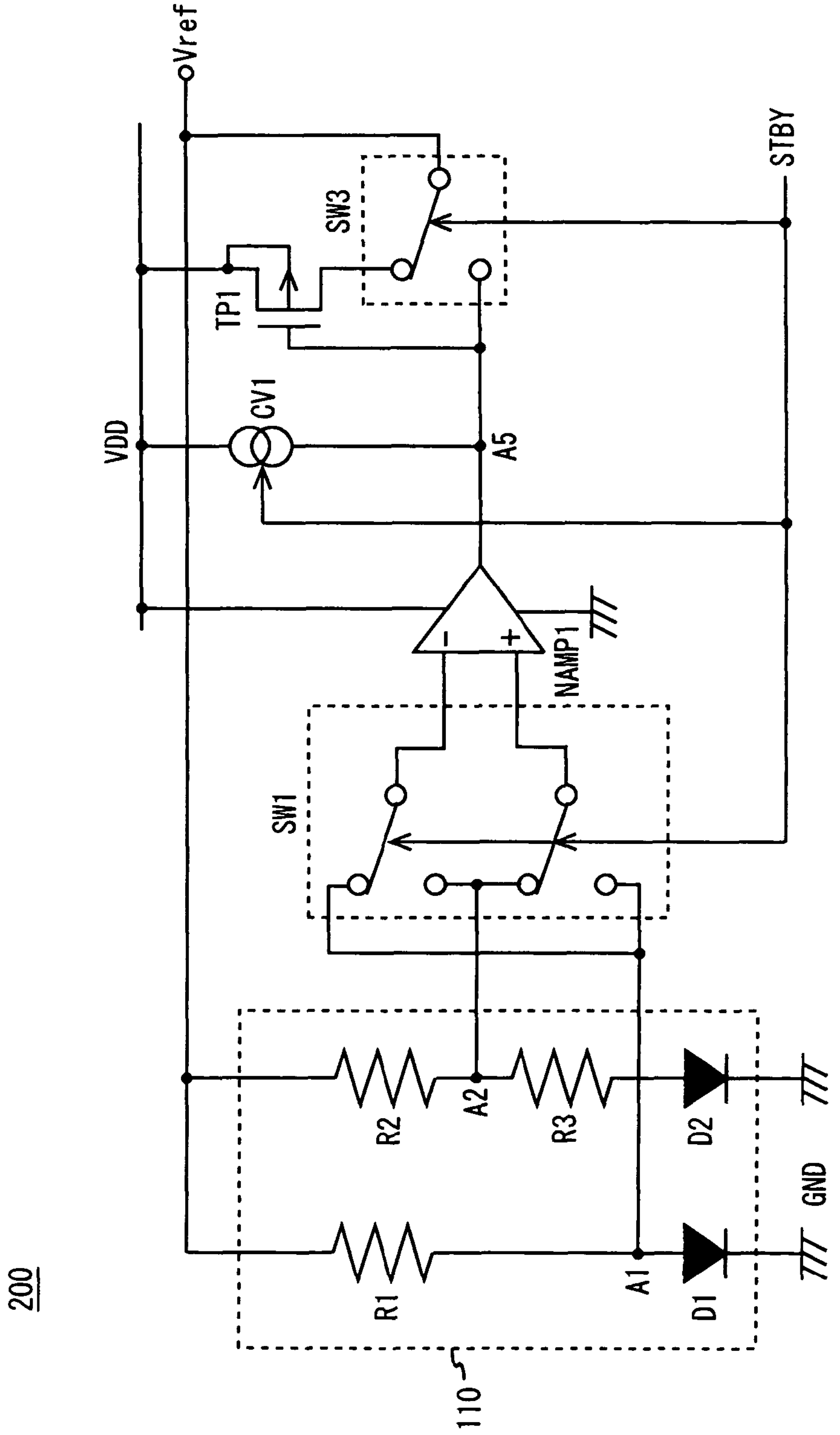
FIG. 4 shows a configuration of a BGR circuit according to a second exemplary embodiment.

A second exemplary embodiment of the present invention is described hereinafter in detail with reference to the drawings. In the second exemplary embodiment, like the first exemplary embodiment, the present invention is applied to a BGR circuit of a liquid crystal display driver. FIG. 4 shows an example of a configuration of a BGR circuit 200 according to the second exemplary embodiment. In FIG. 4, the elements denoted by the same reference symbols as in FIG. 1 have the same or similar configuration as those in FIG. 1. This exemplary embodiment is different from the first exemplary embodiment in that the switch SW2 is eliminated and a variable constant current source CV1 in which a current value of a constant current is variable is used as a constant current source. In the second exemplary embodiment, the difference is mainly described.

Referring to FIG. 4, the BGR circuit 200 includes switches SW1 and SW3, a variable constant current source CV1, an amplifier NAMP1, a PMOS transistor TP1, resistors R1 to R3 and diodes D1 and D2.

The configurations of the switch SW1, the resistors R1 to R3, the diodes D1 and D2 and the amplifier NAMP1 are already described in the first exemplary embodiment and thus not repeatedly described. The output of the amplifier NAMP1, however, is connected to a node A5.

Figure 5:
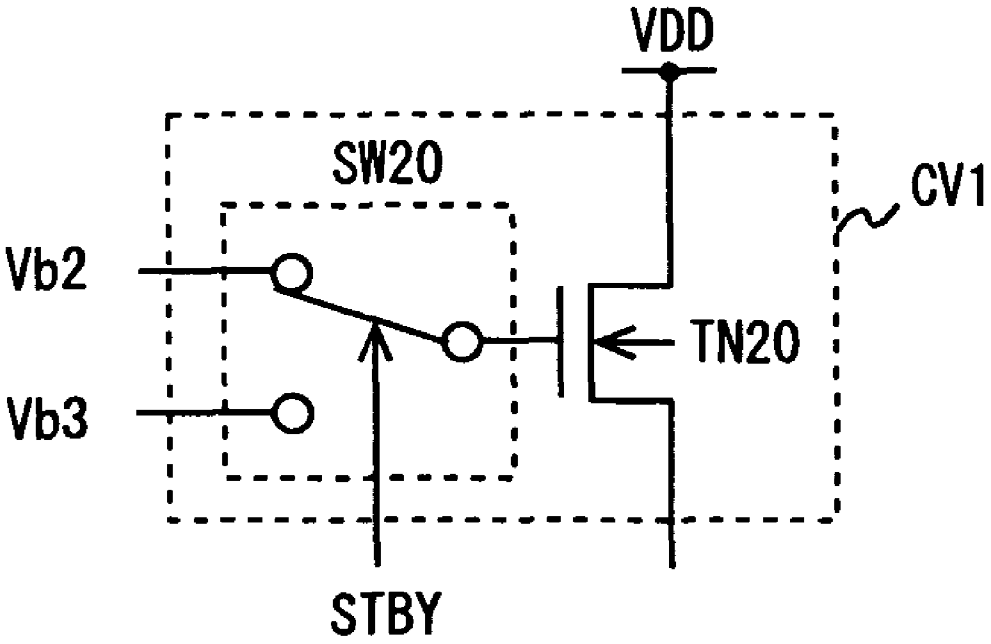
FIG. 5 shows a configuration of a variable constant current source according to the second exemplary embodiment.

The variable constant current source CV1 is connected between a power supply voltage terminal VDD and the node A5. Further, a constant current I1 or I2 with a prescribed current value is selectively supplied in accordance with a control signal STBY. FIG. 5 shows an example of a circuit configuration of the variable constant current source CV1. Referring to FIG. 5, the variable constant current source CV1 includes an NMOS transistor TN20 and a switch SW20.

The NMOS transistor TN20 has a gate connected to the switch SW20, a drain connected to the power supply voltage terminal VDD, and a source serving as a current output terminal of the variable constant current source CV1. The switch SW20 switches between bias voltages Vb2 and Vb3 in accordance with the control signal STBY. If the bias voltage Vb2 is applied to the gate of the NMOS transistor TN20 by the switch SW20, the variable constant current source CV1 supplies the constant current I1. On the other hand, if the bias voltage Vb3 is applied to the gate of the NMOS transistor TN20 by the switch SW20, the variable constant current source CV1 supplies the constant current I2. The relationship between the constant currents I1 and I2 is the same as that in the first exemplary embodiment. The circuit configuration of the variable constant current source CV1 shown in FIG. 5 is just by way of example, and another circuit configuration may be employed as long as it can switch between a plurality of constant currents with different current values by a control signal.

The PMOS transistor TP1 has a source connected to the power supply voltage terminal VDD, a drain connected to the switch SW3, and a gate connected to the node A5.

The switch SW3 switches connection between the reference voltage output terminal Vref with the drain of the PMOS transistor TP1 or the node A5 in accordance with the control signal STBY. In standby mode, the switch SW3 connects the reference voltage output terminal Vref with the drain of the PMOS transistor TP1. In normal operation mode, the witch SW3 connects the reference voltage output terminal Vref with the node A5.

As described above, in the BGR circuit 200 according to the second exemplary embodiment, the variable constant current source CV1 supplies the constant current I1, and the switch SW3 connects the drain of the PMOS transistor TP1 with the reference voltage output terminal Vref in standby mode. Thus, the BGR circuit 200 in this case has the same circuit configuration as the Pch driving type BGR circuit which is described in the first exemplary embodiment. On the other hand, in normal operation mode, the variable constant current source CV1 supplies the constant current I2, and the switch SW3 connects the node AS with the reference voltage output terminal Vref. The BGR circuit 200 in this case has the same circuit configuration as the Nch driving type BGR circuit which is described in the first exemplary embodiment. Thus, the operation of the BGR circuit 200 is basically the same as the operation of the BGR circuit 100 according to the first exemplary embodiment, and the advantage or the like is also similar. Further, the BGR circuit 200 according to the second exemplary embodiment enables elimination of the switch SW2 and one constant current source from the configuration of the BGR circuit 100, thereby allowing reduction of a circuit scale.

[Third Exemplary Embodiment]

Figure 6:
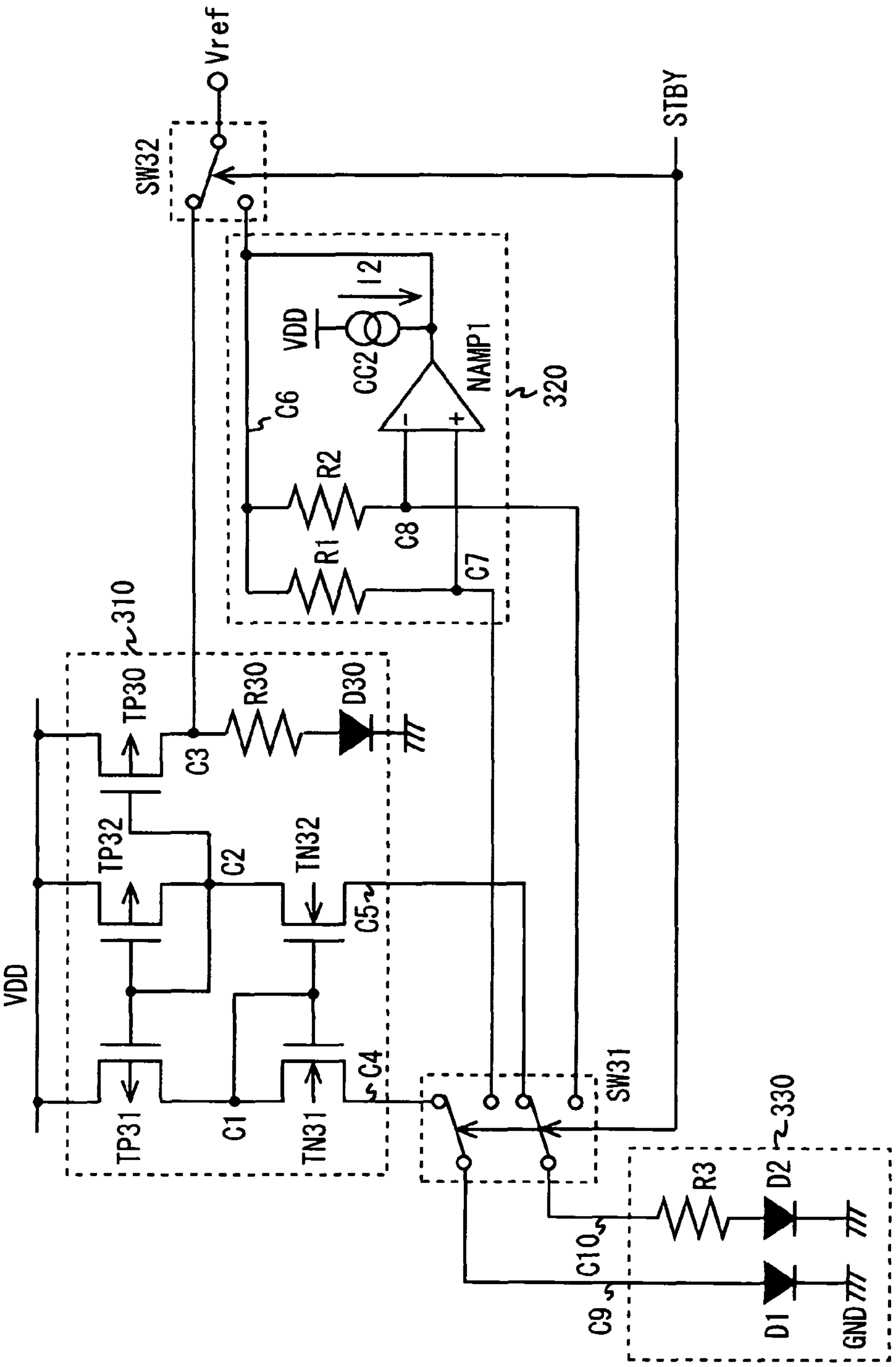
FIG. 6 shows a configuration of a BGR circuit according to a third exemplary embodiment.

A third exemplary embodiment of the present invention is described hereinafter in detail with reference to the drawings. In the third exemplary embodiment, like the first and second exemplary embodiments, the present invention is applied to a BGR circuit of a liquid crystal display driver. FIG. 6 shows an example of a configuration of a BGR circuit 300 according to the third exemplary embodiment. In FIG. 6, the elements denoted by the same reference symbols as in FIG. 1 have the same or similar configuration as those in FIG. 1. The BGR circuit 300 is different from the BGR circuit 100 according to the first exemplary embodiment in that the amplifier NAMP1 is not used in the Pch driving type circuit configuration.

Referring to FIG. 6, the BGR circuit 300 includes circuit blocks 310 to 330 and switches SW31 and SW32.

The circuit block 310 includes PMOS transistors TP30 to TP32, NMOS transistors TN31 and TN32, a resistor R30 and a diode D30. The PMOS transistor TP31 has a source connected to the power supply voltage terminal VDD, a drain connected to a node C1, and a gate connected to a node C2. The PMOS transistor TP32 has a source connected to the power supply voltage terminal VDD, and a drain and a gate connected to the node C2. The PMOS transistor TP30 has a source connected to the power supply voltage terminal VDD, a drain connected to a node C3, and a gate connected to the node C2. The resistor R30 has one end connected to the node C3 and the other end connected to an anode of the diode D30. The diode D30 has an anode connected to the other end of the resistor R30 and a cathode connected to the ground voltage terminal GND. The NMOS transistor TN31 has a drain and a gate connected to the node C1 and a source connected to a node C4. The NMOS transistor TN32 has a drain connected to the node C2, a source connected to a node C5, and a gate connected to the node C1.

The circuit block 320 includes resistors R1 and R2, an amplifier NAMP1 and a constant current source CC2. The resistor R1 has one end connected to a node C6 and the other end connected to a node C7. The resistor R2 has one end connected to the node C6 and the other end connected to a node C8. The amplifier NAMP1 has a non-inverting input terminal connected to the node C7, an inverting input terminal connected to the node C8, and an output terminal connected to a node R. The constant current source CC2 is connected between the power supply voltage terminal VDD and the node C6, and supplies a constant current I2 to the node C6.

The circuit block 330 includes diodes D1 and D2 and a resistor R3. The diode D1 has an anode connected to a node C9 and a cathode connected to the ground voltage terminal GND. The resistor R3 has one end connected to a node C10 and the other end connected to an anode of the diode D2. The diode D2 has an anode connected to the other end of the resistor R3 and a cathode connected to the ground voltage terminal GND.

The switch SW31 connects the circuit block 330 with the circuit block 310 or 320 in accordance with the control signal STBY. Specifically, in standby mode, the switch SW31 connects the node C9 with the node C4, and the node C10 with the node C5. In normal operation mode, the switch SW31 connects the node C9 with the node C7, and the node C10 with the node C8.

The switch SW32 connects the reference voltage output terminal Vref with the circuit block 310 or 320 in accordance with the control signal STBY. Specifically, the switch SW32 connects the node C3 with the reference voltage output terminal Vref in standby mode, and connects the node C6 with the reference voltage output terminal Vref in normal operation mode.

The circuit configuration and operation of the BGR circuit 300 having the above-described configuration in standby mode and in normal operation mode are briefly described hereinbelow. The connection configuration in normal operation mode is the same circuit configuration as the Nch driving type BGR circuit described in the first exemplary embodiment by the switches SW31 and SW32. Accordingly, the operation is the same as that of the Nch driving type BGR circuit which is already described. Further, the BGR circuit 300 has the same advantage and drawback as the Nch driving type BGR circuit.

Figure 7:
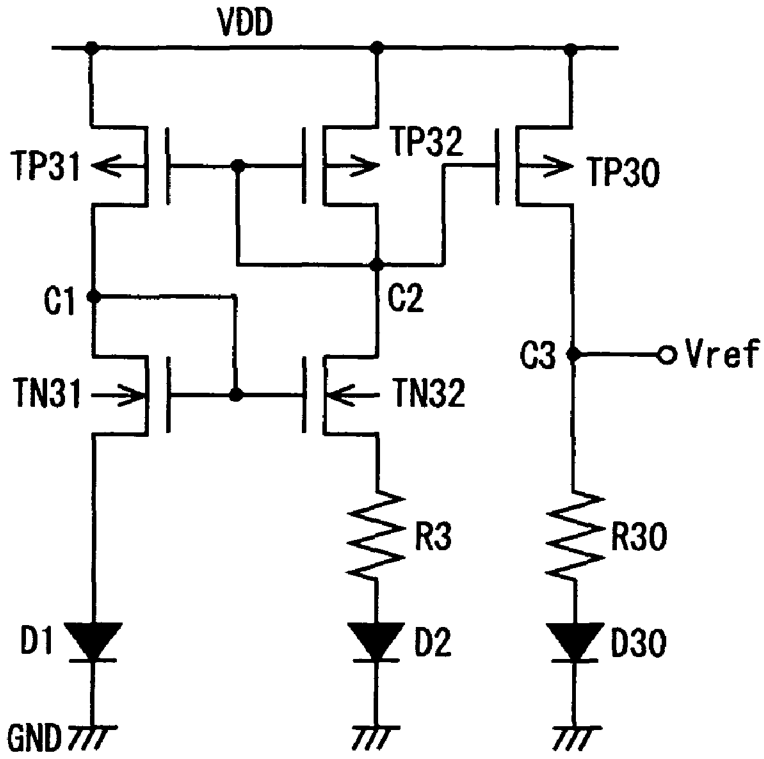
FIG. 7 shows a circuit configuration to describe the operation of the BGR circuit according to the third exemplary embodiment.

The circuit configuration in standby mode is described hereinafter. FIG. 7 shows a circuit configuration that is simplified by omitting the circuit block 320 which is not involved in operation in standby mode and the respective switches. Referring to FIG. 7, the BGR circuit 300 in standby mode has a configuration of a BGR circuit with no operational amplifier which is well known. The circuit operation is also well known and thus not described. In this circuit configuration, temperature characteristics can be cancelled by adjusting the resistance ratio of the resistors R3 and R30 and the area ratio of the diodes D1, D2 and D30 to specified values. In the circuit configuration of FIG. 7 also, loads such as the diode D30 and the resistor R30 are driven by the PMOS transistor TP30 in the final output stage whose source is connected to the power supply voltage terminal VDD. Therefore, this circuit configuration can be regarded as being the same configuration as the Pch driving type BGR circuit which is described earlier in the first exemplary embodiment. It thus has a drawback that the power supply noise rejection ratio is not high enough. In normal operation mode, the circuit block 310 is disconnected from the circuit block 330 by the switch SW31. Accordingly, a current ceases to flow into the PMOS transistors TP31 and TP32, so that a current also ceases to flow into the PMOS transistor TP30 in a current mirror. Hence, an unnecessary current does not flow in the circuit block 310 which is not involved in drive operation in normal operation mode.

As described above, the BGR circuit 300 according to the third exemplary embodiment, like the BGR circuit according to the first and second exemplary embodiments, switches its configuration between the Pch driving type in standby mode and the Nch driving type in normal operation mode, thus having an optimum circuit configuration corresponding to each operating state. Further, because the amplifier is not included, there is no need to take the effects of oscillation, settling time or the like into consideration. It is thus possible to reduce a current in normal operation mode up to the limit where pair characteristics of transistors forming the diodes D1 and D2 are maintained. Further, because there is no need to have two constant current sources and the number of elements is smaller, it is possible to achieve a small layout area. This enables further current reduction during standby and chip area reduction.

The present invention is not limited to the above-described exemplary embodiments, and various changes may be made without departing from the scope of the invention. For example, although the above-described exemplary embodiments are described on the assumption of a BGR circuit of a display driver for a mobile device, the present invention may be applied to all devices in which current consumption differs largely between normal operation mode and power saving mode (standby mode) and stability of a reference voltage in normal operation mode is required. Further, the diodes D1 and D2 may be implemented by a PNP bipolar transistor. In this case, a base and a collector of each transistor are connected to the ground voltage terminal GND.

The first to third exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A reference voltage generator comprising:

an output terminal;

a load circuit connected between the output terminal and a ground voltage terminal;

an output transistor connected between the output terminal and a power supply voltage terminal;

a first constant current source connected between the output terminal and the power supply voltage terminal;

a first switch circuit that selectively connects the output terminal with one of the output transistor and the first constant current source;

a control circuit that controls a band-gap current to be supplied to the load circuit;

a second switch circuit that selectively connects the third node with one of a control terminal of the output transistor and the first constant current source; and a second constant current source connected with the control terminal of the output transistor, wherein in a first state, the first switch circuit connects the output terminal with the output transistor, and the control circuit controls an activation state of the output transistor, and in a second state, the first switch circuit connects the output terminal with the first constant current source, and the control circuit controls the amount of current drawn from the first constant current source, wherein the control circuit controls an activation state of the pull-down transistor in accordance with potentials of a first node and a second node in the load circuit, and the control circuit includes a pull-down transistor connected between a third node being an output end of the control circuit and the ground voltage terminal, and wherein the second switch circuit connects the third node with the control terminal of the output transistor in the first state, and connects the third node with the first constant current source in the second state.

2. The reference voltage generator according to claim 1, wherein the reference voltage generator generates a reference voltage of a display driver of a display device, the first state is when the display driver is in standby operation, and the second state is when the display driver is in normal operation.

3. The reference voltage generator according to claim 1, wherein the load circuit comprises:

a first load unit including:

a first PN junction element connected between the first node and the ground voltage terminal, and a first resistance element and a second PN junction element connected in series between the second node and the ground voltage terminal; and a second load unit including:

a second resistance element connected between the output terminal and the first node, and a third resistance element connected between the output terminal and the second node.

4. The reference voltage generator according to claim 3, wherein the control circuit controls the band-gap current to be supplied to the load circuit by controlling the activation state of the output transistor or the amount of current drawn from the first constant current source in accordance with potentials of the first node and the second node based on the band-gap current.

5. A reference voltage generator comprising:

an output terminal;

a load circuit connected between the output terminal and a ground voltage terminal;

an output transistor connected between the output terminal and a power supply voltage terminal;

a first constant current source connected between the output terminal and the power supply voltage terminal;

a first switch circuit that selectively connects the output terminal with one of the output transistor and the first constant current source;

a control circuit that controls a band-gap current to be supplied to the load circuit;

a second switch circuit that selectively connects the third node with one of a control terminal of the output transistor and the first constant current source; and a second constant current source connected with the control terminal of the output transistor, wherein in a first state, the first switch circuit connects the output terminal with the output transistor, and the control circuit controls an activation state of the output transistor, and in a second state, the first switch circuit connects the output terminal with the first constant current source, and the control circuit controls the amount of current drawn from the first constant current source, wherein the load circuit comprises:

a first load unit including:

a first PN junction element connected between a first node and the ground voltage terminal; and a first resistance element and a second PN junction element connected in series between a second node and the ground voltage terminal; and a second load unit including:

a second resistance element connected between the output terminal and the first node; and a third resistance element connected between the output terminal and the second node, wherein the control circuit controls the band-gap current to be supplied to the load circuit by controlling the activation state of the output transistor or the amount of current drawn from the first constant current source in accordance with potentials of the first node and the second node based on the band-gap current, wherein the control circuit includes a pull-down transistor connected between a third node being an output end of the control circuit and the ground voltage terminal, wherein the control circuit controls an activation state of the pull-down transistor in accordance with potentials of the first node and the second node, and wherein the second switch circuit connects the third node with the control terminal of the output transistor in the first state, and connects the third node with the first constant current source in the second state.

6. The reference voltage generator according to claim 5, wherein either the control terminal of the output transistor or the first constant current source is connected with the third node, and the first constant current source supplies a first constant current in the first state, and the second constant current source supplies a second constant current larger than the first constant current in the second state.

7. A reference voltage generator comprising:

an output terminal;

an output transistor connected between the output terminal and a power supply voltage terminal to provide the power supply voltage to the output terminal;

a first constant current source connected between the output terminal and the power supply voltage terminal;

a first switch circuit that selectively connects the output terminal with one of the output transistor and the first constant current source;

a control circuit that controls a band-gap current to be supplied to a first circuit;

a second switch circuit that selectively connects the third node with one of a control terminal of the output transistor and the first constant current source; and a second constant current source connected with the control terminal of the output transistor, wherein in a first state, the first switch circuit connects the output terminal with the output transistor, and the control circuit controls an activation state of the output transistor, wherein in a second state, the first switch circuit connects the output terminal with the first constant current source, and the control circuit controls the amount of current drawn from the first constant current source, wherein the control circuit controls an activation state of the pull-down transistor in accordance with potentials of a first node and a second node in the first circuit, and the control circuit includes a pull-down transistor connected between a third node being an output end of the control circuit and the ground voltage terminal, and wherein the second switch circuit connects the third node with the control terminal of the output transistor in the first state, and connects the third node with the first constant current source in the second state.

8. The reference voltage generator according to claim 7, wherein the control circuit controls the band-gap current to be supplied to the first circuit by controlling the activation state of the output transistor or the amount of current drawn from the first constant current source in accordance with potentials of the first node and the second node based on the band-gap current.

9. The reference voltage generator according to claim 7, wherein either the control terminal of the output transistor or the first constant current source is connected with the third node, and the first constant current source supplies a first constant current in the first state, and the second constant current source supplies a second constant current larger than the first constant current in the second state.

* * * * *